April 30, 1935. R. H. DYER 1,999,805
APPARATUS FOR ELECTRICALLY WELDING SEAMS
Filed June 18, 1931 3 Sheets-Sheet 1

INVENTOR.
Rex H. Dyer
ATTORNEY.

INVENTOR.
Rex H. Dyer
BY
ATTORNEY.

UNITED STATES PATENT OFFICE 1,999,805

APPARATUS FOR ELECTRICALLY WELDING SEAMS

Rex H. Dyer, Independence, Mo.

Application June 18, 1931, Serial No. 545,167

5 Claims. (Cl. 219—6)

This invention relates to a method of and apparatus for welding and more particularly to the continuous electric welding of longitudinal seams, as in the manufacture of metal tubing, the principal object of the invention being to provide a weld which is stronger and superior in quality to the welds resulting from present known methods of electric welding.

It is also an object of the invention to provide a method of welding which is not dependent on certain specified critical temperatures or fixed correlation between the speed of the work and the fluctuations of the heating current to form a successful weld.

It is an additional object of my invention to provide a method of welding that does not effect upsetting of the edges of the seam in order to obtain proper pressure in producing a weld of desired texture, thereby providing a finished product which is substantially free from distortion and which requires little or no reshaping of the seam after the weld is made.

In accomplishing these and other objects of my invention, I employ an improved apparatus, the preferred form of which is illustrated in the accompanying drawings, wherein.

Figure 1:
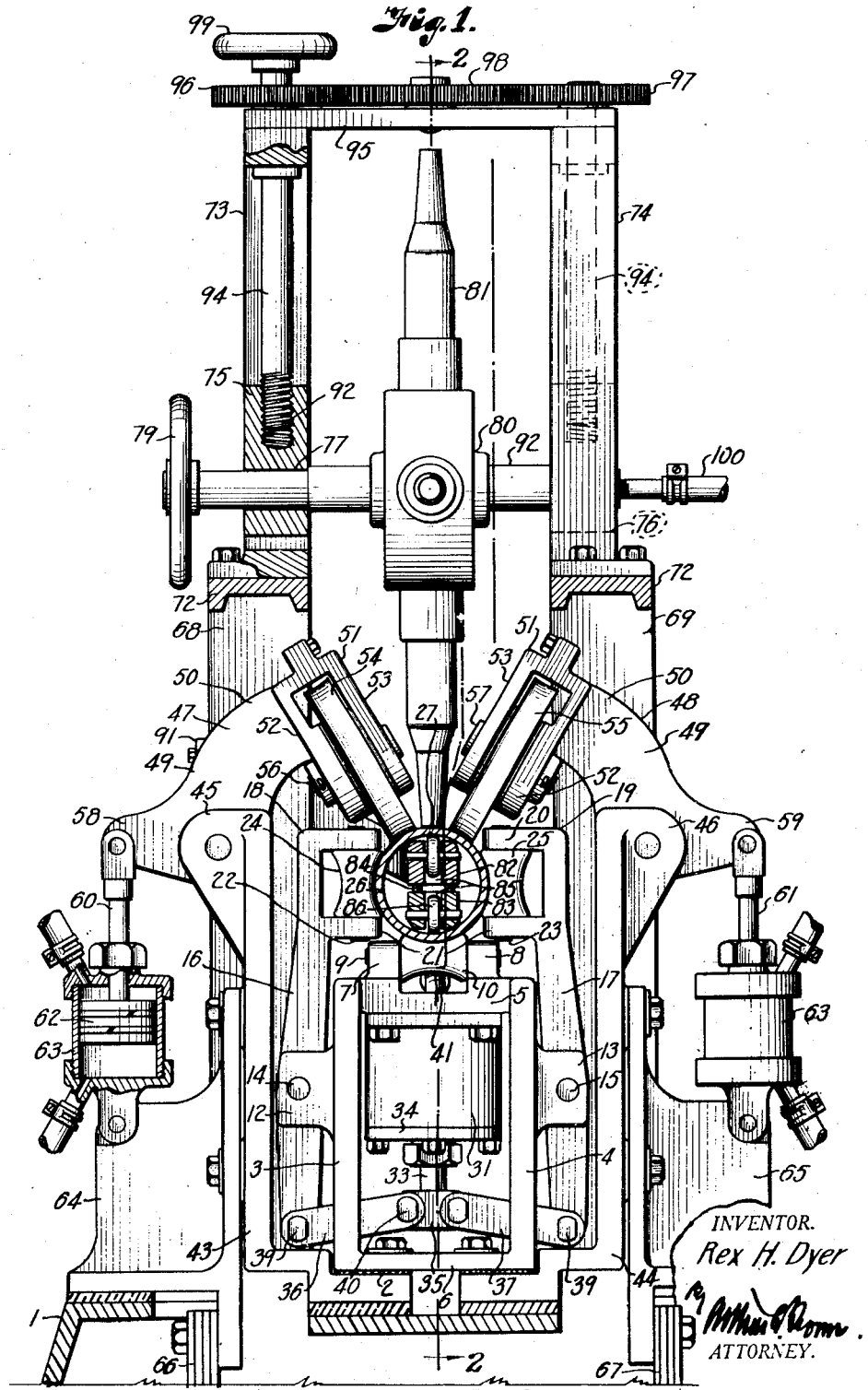
Fig. 1 is a cross sectional view through a welding machine for the welding of tubing in accordance with my invention.

Referring more in detail to the drawings:

1 designates a base for supporting a rectangular metal frame 2 positioned crosswise thereof and having vertical legs 3 and 4 connected at their upper and lower ends by cross bars 5 and 6 respectively.

Extending upwardly from the cross bar 5 are spaced ears 7 and 8 providing support for a horizontal shaft 9 carrying a guide roller 10. The roller 10 has a concave periphery 11 conforming to the curvature of the tubing stock which is fed through the machine as later described.

Extending laterally from the legs 3 and 4 about midway of their length are ears 12 and 13 carrying pivot shafts 14 and 15 for pivotally mounting vertical levers 16 and 17. The levers 16 and 17 extend upwardly above the upper end of the frame 3 and are provided with yoke-shaped heads 18 and 19 having spaced arms 20 and 21 extending inwardly toward the roller 10, as illustrated in Fig. 1.

Rotatably mounted between the arms 20 and 21 on vertical shafts 22 and 23 carried by the arms are guide rollers 24 and 25 conforming in shape to the roller 10 and which cooperate therewith to form a guide throat through which the tubing stock 26 is passed to effect closure of its seam edges 27 and 28.

It may be here stated that the tubing stock is preferably pre-formed from flat ribbon material into substantially tubular shape before it is delivered to the welding machine. The side edges of the seam are preferably beveled as at 29 and 30 to form an overlapping joint when they are brought together and also to prevent upsetting thereof when sufficient pressure is applied to retain the lapped edges in intimate contact with each other to permit passage of the welding current.

In order that the pressure acting on the tubing may be limited and under control of the operator at all times to prevent upsetting and misalignment of the edges, the supporting levers for the rollers 24 and 25 are operable by a fluid pressure actuating mechanism now described.

Fixed to the under side of the cross bar 5 is a cylinder 31 and slidable therein is a piston 32 having a depending rod 33 extending through the lower head 34 of the cylinder. Mounted on the lower end of the rod is a cross head 35 carrying toggle levers 36 and 37 connecting the head with the depending ends of the lever arms 16 and 17, the toggle links being connected with the levers and head by suitable pivot pins 39 and 40 respectively.

The cylinder may be supplied with fluid pressure medium for acting on opposite sides of the piston through suitable pipe connections 41 and 42 whereby the pistons may be actuated in either direction to move the guide rollers 24 and 25 to and from the pipe stock and to retain them in desired spaced position for effecting proper closure of the seam.

It is apparent that the position of the piston is governed by flow of the pressure medium to and from the cylinder which may be controlled by suitable valves, not shown, so that rollers are spaced apart the required distance to effect closing of the seam without upsetting the edges thereof as the stock is passed between the electrode rollers hereafter described. This is an important feature of the invention since pressures which effect upsetting are detrimental to the weld, because, if the temperature is raised too slowly, the pressure required to upset reduces the capacity of the machine, and if the edges are softened to too great an extent the upsetting will be distributed laterally of the seam to cause buckling and sloughing of the metal; but if the pressure is controlled so as to prevent upsetting of the edges, the temperature is not critical, as there is no pressure tending to force the soft mushy edges out of alignment when they are over-heated by an excessive current or are retained for too long a period under the heating current due to too slow rate of speed. It is thus apparent that the rate of speed and current supply is not critical to my welding process.

Supported on opposite sides of the base 1 in alignment with the frame 2 are spaced standards 43 and 44 having outwardly extending ears 45 and 46 for pivotally mounting electrode holders 47 and 48. The electrode holders preferably comprise bell crank levers 49 having upwardly inclined arms 50 terminating in downwardly inclined heads 51. The heads 51 are preferably yoke-shaped and have arms 52 and 53 spaced apart to accommodate roller electrodes 54 for the holder 47, and 55 for the holder 48, the electrode rollers being rotatively mounted on shafts 56 and 57 carried by the arms 52 and 53. The peripheries of the electrode rollers are preferably concave, conforming in curvature to the pipe and are adapted to operate thereon adjacent the side edges of the seam being welded.

In order that sufficient pressure may be applied to maintain the peripheries of the rollers in firm electrical contact with the surface of the tubing, the other arms 58 and 59 of the bell crank levers are pivotally connected by piston rods 60 and 61 with pistons 62 operable in cylinders 63 pivotally supported on webs 64 and 65 extending laterally from the standards 43 and 44 and supported by the base 1.

A suitable current is supplied to the electrode holders through conductors 66 and 67 to pass a heating current across the seam between the electrodes. The resistance of the current heats the edges of the seam to welding temperature as the tubing stock is fed through the machine. It is obvious that with the process thus far described, the edges of the seam are simply heated to welding temperature and if the pipe continues through the machine, the edges will spring apart and no weld is effected.

I therefore provide for uniting the heated edges by a forging operation directly at the time the heating current is passed through the seam which consists of impacting the seam with rapid impulses having sufficient intensity to compact and unite said edges as now described.

Supported by the base 1 and straddling the electrode holders 47 and 48 are spaced side frames 68 and 69, each comprising spaced vertical legs 70 and 71 connected at their upper ends by cross members 72. Bolted to the cross members 72 and supported thereon are vertical brackets 73 and 74 having guide tracks for vertically adjustable bearing blocks 75 and 76 that are carried thereby. The bearing blocks 75 and 76 are provided with bearing openings 77 for rotatably mounting a horizontal shaft 78 adapted to be rotated by a hand wheel 79 fixed to a projecting end thereof adjacent the bearing block 75, as illustrated in Fig. 1.

Carried on the shaft 78 between the electrode rollers and positioned in the plane of the tubing seam is a turret shaped forging member 80 which preferably comprises a plurality of radially extending pneumatic hammers 81.

While a single hammer is sufficient to accomplish my purpose, I prefer to provide a plurality of hammers as described, so that the hammers may be moved from the work when they become too hot and allowed to cool while another hammer is being used.

Figure 2:
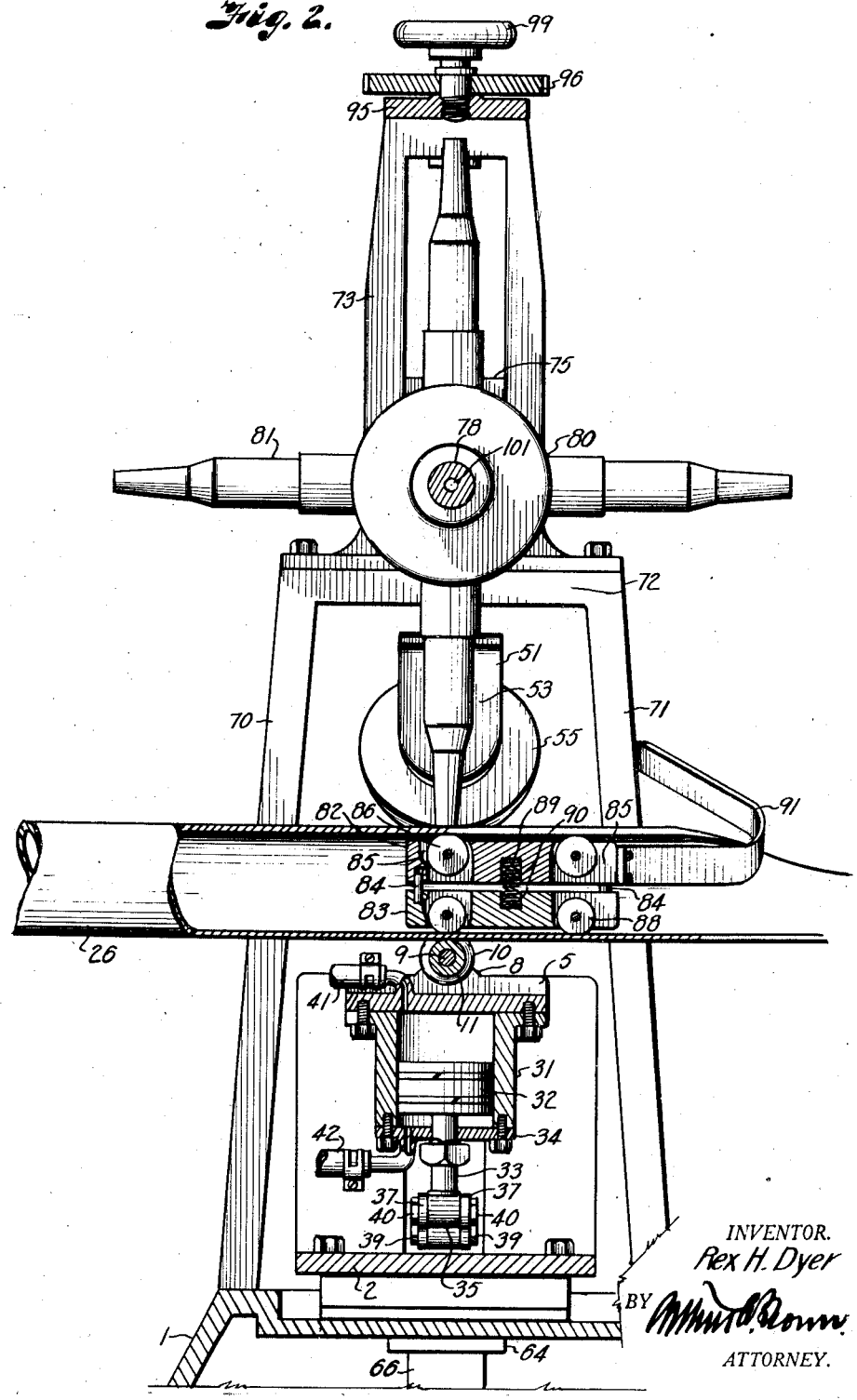
Fig. 2 is a longitudinal sectional view through the machine on the line 2—2, Fig. 1.

In order to support the wall of the tubing and back up the hammer acting on the seam, a roller mandrel is provided comprising a pair of superimposed blocks 82 and 83 which are retained in alignment with each other by dowel pins 84. The blocks are provided at their ends with sockets 85 to accommodate rollers 86 and 88 contacting the walls of the tubing in the vertical plane of the seam. The blocks are spread apart by a spring 89 carried in aligning sockets 90 provided in adjacent faces thereof as shown in Fig. 2.

The mandrel is retained against longitudinal movement by an arm 91 which is fixed to the frame of the machine and projects through the open seam of the tubing so that one set of rollers is positioned directly under the hammer.

In order that the force of the impacts may be controlled, I provide for moving the hammers to and from the work as now described.

Formed in the upper faces of the bearing blocks are threaded sockets 92, and threaded therein are screw shafts 94 rotatably mounted in the upper ends of the brackets 73 and in the ends of a cross bar 95 that connects the brackets as illustrated in Fig. 1.

To adjust the bearing blocks in unison, the upper ends of the shafts 94 are provided with gears 96 and 97 operably connected by an idle gear 98 which is rotatably carried intermediate the ends of the bar 95 so that when one of the shafts 94 is actuated by a suitable hand wheel 99, the other shaft is operated accordingly to adjust its bearing block proportionately to the other bearing block.

The pneumatic hammers 81 may be supplied with compressed air through a hose 100 communicating with a channel 101 formed in the shaft 78.

Figure 3:
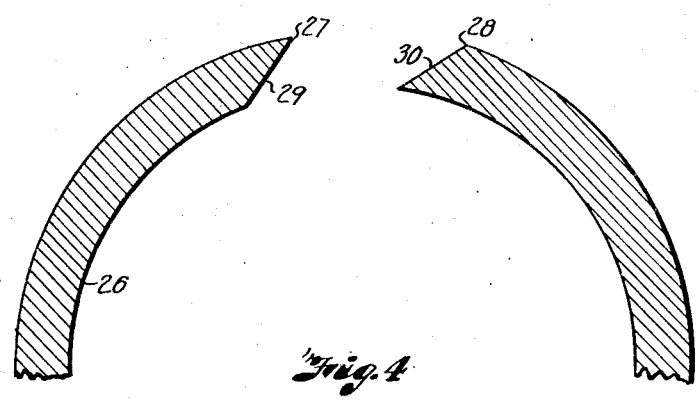
Fig. 3 is a detail cross sectional view through the tubing stock, illustrating the seam before it is closed.
Figure 4:
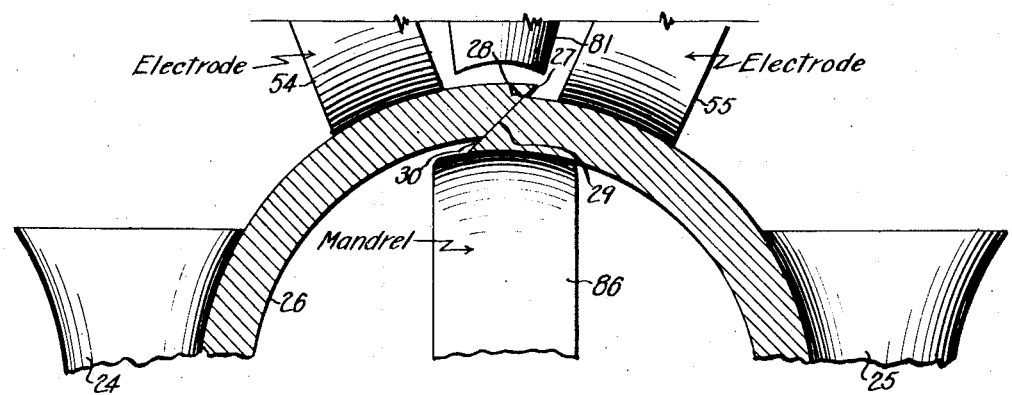
Fig. 4 is a similar cross sectional view through the tubing stock illustrating the seam as being closed in the process of welding.
Figure 5:
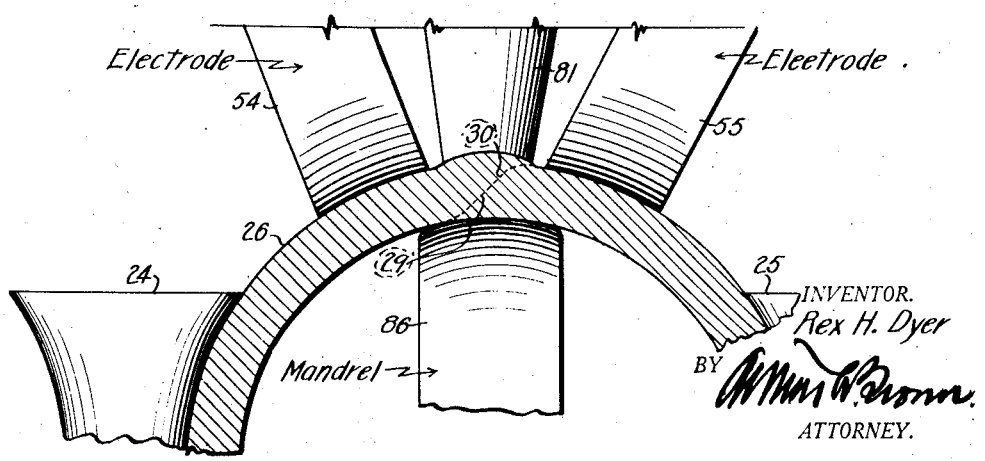
Fig. 5 is a similar view illustrating the seam as being completely welded.

In operating a welding machine constructed and assembled as described, the tubing stock having its edges beveled at approximately 45° as shown in Fig. 3, is fed between the guide rollers 24 and 25 and over the roller 10. The rollers 24 and 25 are then positioned to properly close the seam without upsetting, so that the beveled edges are moved to overlapping position as illustrated in Fig. 4. The heating current passing between the rollers heats the stock to a welding temperature and the hammer acting on the seam forges it into position as shown in Fig. 5 to complete the weld. When the hammer acting on the seam has become heated, the hand wheel may be actuated to bring another hammer into play.

Attention is particularly directed to the overlapping of the beveled edges of the seam as shown in Fig. 4. This is important since the pressure causing the edge 27 to ride onto the edge 28 causes the edges to be retained in intimate wiping contact with each other when the current is passed therethrough. At the same time the offsetting of the edges provides sufficient increased thickness to produce the weld as shown in Fig. 5.

Natural expansion of the joint, due to heat, will not cause warping or upsetting, since one edge is free to accommodate itself by sliding further over the other edge.

In conclusion, it may be stated that impacting the weld directly at the point where the heat is at its highest, a substantially perfect weld results having better texture than that of the original metal. Moreover, there is no danger of the impacts spreading the seam apart, as at this point the edges are most easily united and compacted since the metal is readily malleable without creating internal tension that may tend to disrupt and warp the tubing.

The tubing therefore requires little or no reshaping and there is no extruded burr to be removed as in the case of present most successful methods of welding.

The forging of the weld at the time it is heated is also very important since a continuous weld is provided having uniform texture throughout its entire length, the forging preventing a recurrent or stitch weld from taking place, caused by the cycles of the alternating current employed in heating the joint.

I have found by actual experiments that successful welds can be produced with less heat than is required by the present welding methods, for example a temperature of 2000 degrees produces an effective weld when utilizing the hammer, as against 2350 degrees in the present butt welding methods.

What I claim and desire to secure by Letters Patent is:

1. In a machine for progressively welding the edges of metal including a frame, means on the frame for supporting the edges of the metal, spaced rollers engaging the metal to be welded in the vertical transverse plane of said supporting means, means pivotally supporting the rollers on the frame with their axes substantially in said plane and for swinging movement toward each other for moving said edges in wiping overlapping electrical contact with each other, a pair of electrodes, means supporting the electrodes on the frame with their axes substantially in said plane and in electrical contact with the respective edges of the metal to pass an electrical current through said edges during movement of said edges relatively to each other, a percussion device supported in said plane and operating over said supporting means and arranged to strike the metal to move said edges into registering alignment with each other to effect a weld, and means connected with said electrode supporting means for retaining said electrodes in contact with the metal during movement of the edges whereby the current is effective during operation of the percussion device.

2. In a machine for progressively welding the edges of metal including a frame, means on the frame for supporting the edges of the metal, spaced rollers engaging the metal to be welded, means pivotally supporting the rollers on the frame for swinging movement toward each other and in a vertical transverse plane extending through said supporting means, a toggle connection between said pivotal supporting means, means on the frame for actuating the toggle connection to effect movement of the rollers into engagement with the metal and movement of said edges into wiping electrical contact with each other, a pair of electrodes, means supporting the electrodes on the frame in electrical contact with the metal in said plane to pass an electric current through said edges during movement of the edges relatively to each other, and means carried by the frame for moving said edges into registering alignment with each other to effect a weld.

3. In a machine for progressively welding the edges of metal including a frame, means on the frame supporting the edges of the metal, spaced rollers engaging the metal to be welded, means pivotally supporting the rollers on the frame for swinging movement toward each other with their axes located in a plane extending transversely through said supporting means, fluid pressure operated means on the frame connected with said pivotal mounting means to move the rollers into engagement with the metal and for moving said edges into wiping overlapping electrical contact, a pair of electrode rollers, means swingingly supporting the electrode rollers on the frame with their axes substantially in said plane, means for actuating said electrode supporting means to retain the electrodes in contact with the metal whereby an electric current is passed through said edges during movement of said edges relatively to each other, and a percussion device supported in said plane and arranged to strike the metal to move said edges into alignment with each other to effect a weld.

4. In a machine for progressively welding the edges of metal including a frame, means on the frame supporting the edges of the metal, spaced rollers engaging the metal to be welded in a plane extending transversely through said edge supporting means, means pivotally supporting the rollers on the frame for swinging movement toward each other, fluid pressure operated means on the frame connected with said pivotal mounting means to move the rollers into engagement with the metal and for moving said edges into wiping overlapping electrical contact, a pair of electrode rollers, means swingingly supporting the electrode rollers on the frame with their axes in said plane, means for actuating said electrode supporting means to retain the electrodes in contact with the metal whereby an electric current is passed through said edges during movement of said edges relatively to each other.

5. In a machine for progressively welding the edges of metal in tubular form including a frame, means on the frame supporting the edges of the metal, a pair of electrode rollers, bell cranks supporting the electrode rollers on the frame to contact the edges of the metal in a plane extending transversely through the supporting means, means for actuating the bell cranks to retain pressure on the electrode rollers, guide rollers at opposite sides of the tubular form, levers supporting the guide rollers with their axes substantially in said plane, a toggle mechanism connected with said levers, means for actuating the toggle levers to cause the guide rollers to move said edges into electrical contact with each other, and a percussion device supported in said plane for striking the metal to move said edges into registering alignment with each other to effect a weld.

REX H. DYER.